US010154214B2

(12) United States Patent
Liim et al.

(10) Patent No.: US 10,154,214 B2
(45) Date of Patent: Dec. 11, 2018

(54) IMAGE SENSOR HAVING IMPROVED SIGNAL-TO-NOISE RATIO AND REDUCED RANDOM NOISE AND IMAGE PROCESSING SYSTEM

(71) Applicant: SAMSUNG ELECTRONICS CO., LTD., Suwon-si, Gyeonggi-Do (KR)

(72) Inventors: Moo Sup Liim, Yongin-si (KR); Seung Sik Kim, Hwaseong-si (KR); Sung Young Seo, Bucheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/156,634

(22) Filed: May 17, 2016

(65) Prior Publication Data
US 2016/0344963 A1 Nov. 24, 2016

(30) Foreign Application Priority Data

May 20, 2015 (KR) .................. 10-2015-0070652

(51) Int. Cl.
*H04N 5/3745* (2011.01)
*H04N 5/378* (2011.01)
*H04N 5/357* (2011.01)
*H04N 5/347* (2011.01)

(52) U.S. Cl.
CPC .......... *H04N 5/3745* (2013.01); *H04N 5/347* (2013.01); *H04N 5/357* (2013.01); *H04N 5/378* (2013.01)

(58) Field of Classification Search
None
See application file for complete search history.

(56) References Cited

U.S. PATENT DOCUMENTS

| 6,674,094 | B2 | 1/2004 | Sekine |
| 7,242,427 | B2 | 7/2007 | Kokubun et al. |
| 8,363,142 | B2 | 1/2013 | Tashiro |
| 2013/0141620 | A1 | 6/2013 | Nakajima |
| 2013/0229543 | A1 | 9/2013 | Hashimoto et al. |
| 2013/0341750 | A1 | 12/2013 | Ichikawa et al. |

(Continued)

FOREIGN PATENT DOCUMENTS

| JP | 2013090160 | 5/2013 |
| JP | 2013138327 | 7/2013 |

(Continued)

*Primary Examiner* — Justin P. Misleh
(74) *Attorney, Agent, or Firm* — Volentine, Whitt & Francos, PLLC

(57) ABSTRACT

An image sensor having improved signal-to-noise ratio and reduced random noise and an image processing system are provided. The image sensor includes a pixel array including a pixel connected to a column line and configured to provide an analog pixel signal to the column line in response to at least one row control signal, and an analog-to-digital converter (ADC) that receives and converts the analog pixel signal into a corresponding digital pixel signal. The pixel includes a group of sub-pixels simultaneously selected by the at least one row control signal, such that each one of the sub-pixels in the group of sub-pixels provides a sub-pixel signal, and the analog pixel signal is an average of the sub-pixel signals provided by the group of sub-pixels.

12 Claims, 14 Drawing Sheets

(56) References Cited

U.S. PATENT DOCUMENTS

| | | | | |
|---|---|---|---|---|
| 2015/0062394 A1* | 3/2015 | Ikeda | .................... | H04N 5/347 |
| | | | | 348/301 |
| 2015/0189249 A1* | 7/2015 | Hiyama | ................ | H04N 9/045 |
| | | | | 348/281 |
| 2015/0350583 A1* | 12/2015 | Mauritzson | ............ | H04N 5/378 |
| | | | | 250/208.1 |
| 2016/0037092 A1* | 2/2016 | Chae | .................... | H04N 5/378 |
| | | | | 348/300 |
| 2016/0037112 A1* | 2/2016 | Shim | .................... | H04N 5/378 |
| | | | | 348/301 |
| 2016/0286108 A1* | 9/2016 | Fettig | ................... | H04N 5/2355 |
| 2016/0316158 A1* | 10/2016 | Uchida | ................ | H04N 5/3696 |

FOREIGN PATENT DOCUMENTS

| | | |
|---|---|---|
| JP | 2013157881 | 8/2013 |
| JP | 2014187423 | 10/2014 |

* cited by examiner

IMAGE SENSOR HAVING IMPROVED SIGNAL-TO-NOISE RATIO AND REDUCED RANDOM NOISE AND IMAGE PROCESSING SYSTEM

CROSS-REFERENCE TO RELATED APPLICATIONS

This application claims priority under 35 U.S.C. § 119(a) from Korean Patent Application No. 10-2015-0070652 filed on May 20, 2015, the disclosure of which is hereby incorporated by reference in its entirety.

BACKGROUND

Embodiments of the inventive concept relate to image sensors and image processing systems. More particularly, embodiments of the inventive concept relate to image sensors having improved signal-to-noise ratios and reduced random noise, as well as image processing systems including same.

Complementary metal oxide semiconductor (CMOS) image sensors are solid-state sensing devices. CMOS image sensors have relatively low manufacturing costs and lower power consumption and may be produced in relatively smaller sizes, as compared with charge coupled device (CCD) image sensors. In addition, the performance of CMOS image sensors has been improved as compared with early developmental stages. Thus, CMOS image sensors are commonly used for variety of applications and as constituent components of many different electronic appliances including portable devices such as smart phones and digital cameras. The quality of an image generated by a CMOS image sensor is influenced by the signal-to-noise ratio (SNR) and random noise of the CMOS image sensor.

SUMMARY

Embodiments of the inventive concept provide image sensors providing excellent image quality as the result of improved signal-to-noise ratio and reduced random noise, as well as image processing systems including same According to some embodiments of the inventive concept, there is provided an image sensor including; a pixel array including a pixel connected to a column line and configured to provide an analog pixel signal to the column line in response to at least one row control signal, and an analog-to-digital converter (ADC) that receives and converts the analog pixel signal into a corresponding digital pixel signal. The pixel comprises a group of sub-pixels simultaneously selected by the at least one row control signal, such that each one of the sub-pixels in the group of sub-pixels provides a sub-pixel signal, and the analog pixel signal is an average of the sub-pixel signals provided by the group of sub-pixels.

According to some other embodiments of the inventive concept, there is provided an image processing system including; an image sensor that provides an output signal, a processor that controls operation of the image sensor, receives the output signal and generates an image signal from the output signal, and a display unit that displays an image corresponding to the image signal received from the processor. The image sensor includes; a pixel array including a pixel connected to a column line and configured to provide an analog pixel signal to the column line in response to at least one row control signal, and an analog-to-digital converter (ADC) that receives and converts the analog pixel signal into a corresponding digital pixel signal. The pixel comprises a group of sub-pixels simultaneously selected by the at least one row control signal, such that each one of the sub-pixels in the group of sub-pixels provides a sub-pixel signal, and the analog pixel signal is an average of the sub-pixel signals provided by the group of sub-pixels.

According to some other embodiments of the inventive concept, there is provided an image processing system including; an image sensor that provides an output signal, a processor that controls operation of the image sensor, receives the output signal and generates an image signal from the output signal, and a display unit that displays an image corresponding to the image signal received from the processor. The image sensor comprises a plurality of pixels arranged in a pixel array, each one of the plurality of pixels provides an analog pixel signal and comprises two or more sub-pixels simultaneously selected by the at least one row control signal, such that each one of the sub-pixels provides a corresponding sub-pixel signal, the analog pixel signal being derived from the sub-pixel signals provided by the two or more sub-pixels.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION

Certain embodiments of the inventive concept will now be described in some additional detail with reference to the accompanying drawings. The inventive concept may, however, be embodied in many different forms and should not be construed as being limited to only the embodiments set forth herein. Rather, these embodiments are provided so that this disclosure will be thorough and complete, and will fully convey the scope of the invention to those skilled in the art. Throughout the written description and drawings like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
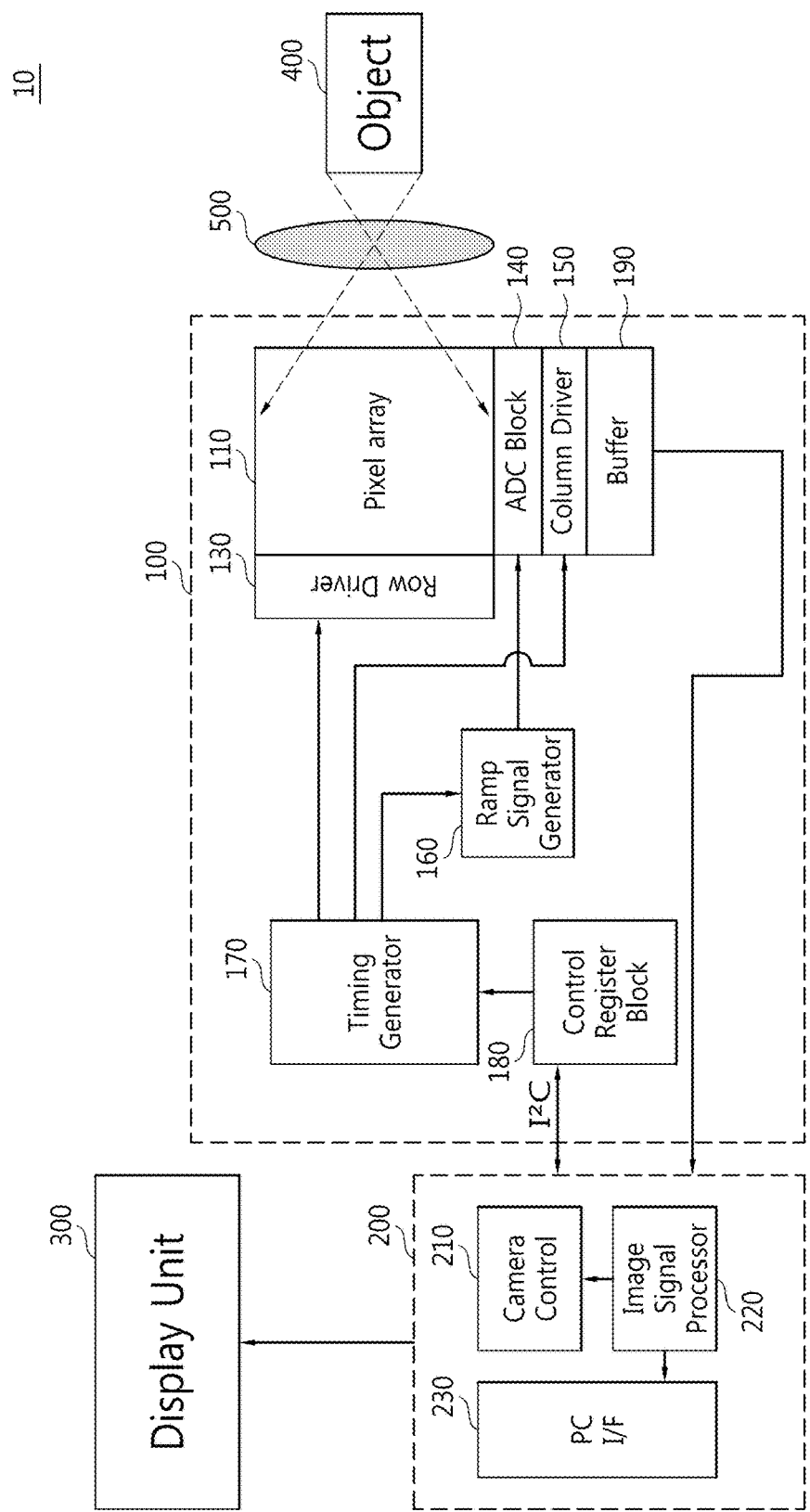
FIG. 1 is a block diagram illustrating an image processing system including an image sensor according to various embodiments of the inventive concept.

Figure (FIG. 1 is a block diagram of an image processing system 10 including an image sensor 100 according to an embodiment of the inventive concept. The image processing system 10 of FIG. 1 includes in addition to the image sensor 100, an image processor, such as a digital signal processor (DSP) 200, a display unit 300, and a lens 500. The image sensor 100 generally includes a pixel array 110, a row driver 130, an analog-to-digital converter (ADC) block 140, a column driver 150, a ramp signal generator 160, a timing generator 170, a control register block 180, and a buffer 190.

The image sensor 100 as controlled by the DSP 200 is able to sense an object 400 captured via the lens 500. In response to electrical signals provided by the image sensor 100, the DSP 200 outputs corresponding image signal(s) for the sensed object 400 to the display unit 300. Here, the display unit 300 may be any electronic device capable of displaying an image, such as a computer, a cellular phone, or similar device equipped with a camera. In an embodiment of FIG. 1, it is assumed that the display unit is a Personal Computer (PC), but is not restricted there-to.

Thus, the DSP 200 of FIG. 1 includes a camera control 210, an image signal processor (ISP) 220, and a PC interface (I/F) 230. The camera control 210 define certain control data stored in the control register block 180 of the image sensor 100. In this manner, the camera control 210 may be used to control the operation of the image sensor 100. In one example, the camera control 210 and control register block 180 may be implemented as an inter-integrated circuit ($I^2C$), but the scope of the inventive concept is not restricted thereto.

The ISP 220 receives an output signal (e.g., image data, output data or a corresponding signal from the buffer 190), processes the image data into a corresponding visual image, and provides a corresponding image signal to the display unit 300 via the PC I/F 230. Thus, the ISP 220 may be disposed within the DSP 200 as shown in FIG. 1. However, the ISP 220 might alternately be disposed within the image sensor 100.

The pixel array 110 includes a plurality of pixels (see, e.g., elements 115 of FIG. 2) respectively including a photoelectric conversion element such as a photodiode or pinned photodiode. In its operation, each pixel 115 senses light using the photoelectric conversion element and converts incident light into a corresponding electrical signal. Collectively, the electrical signals provided by one or more pixels may be used to generate an image signal.

The timing generator 170 may be used to provide one or more timing control signal(s) and/or clock signal(s) to the row driver 130, ramp signal generator 160, and column driver 150 in order to control the timing and operation of the row driver 130, ramp signal generator 160, and column driver 150. The control register block 180 communicates control data and/or one or more clock signal(s) from the DSP 200 to the timing generator 170.

The row driver 130 drives the pixel array 110 in row/column oriented units. For instance, the row driver 130 may generate row control signals (e.g., RCS1 through RCSn of FIG. 2) that are used to control the operation of various pixels (e.g., a row of pixels) arranged in pixel array 110. In response, the pixel array 110 provides a plurality of pixel signals (e.g., PS1 through PSm of FIG. 2) from a row selected by the row control signals RCS1 through RCSn provided via the row driver 130 to the ADC block 140. Here, the pixel signals PS1 through PSm are respective analog signals.

The ADC block 140 converts the analog pixel signals PS1 through PSm received from the pixel array 110 into corresponding digital pixel signals (e.g., DP1 through DPm of FIG. 2) in response to a ramp signal (e.g., the Ramp signal of FIG. 2) received from the ramp signal generator 160. Thereafter, the digital pixel signals DP1 through DPm are provided to the buffer 190.

The column driver 150 may be used to control the operation of the ADC block 140 and buffer 190 in response to one or more control signal(s)/clock(s) received from the timing generator 170. In other words, the column driver 150 may be used to control the output of pixel signal(s) for respective pixel columns of the pixel array 110 and the corresponding generation of digital pixel signal(s).

Thus, the buffer 190 may be used to temporarily store the digital pixel signals DP1 through DPm provided by the ADC block 140. Further, the buffer 190 may include circuitry capable of aggregating, sensing and/or amplifying (e.g., sense amplifier 194 of FIG. 2) the digital pixel signals DP1 through DPm in order to provide an output signal to the ISP 220.

Figure 2:
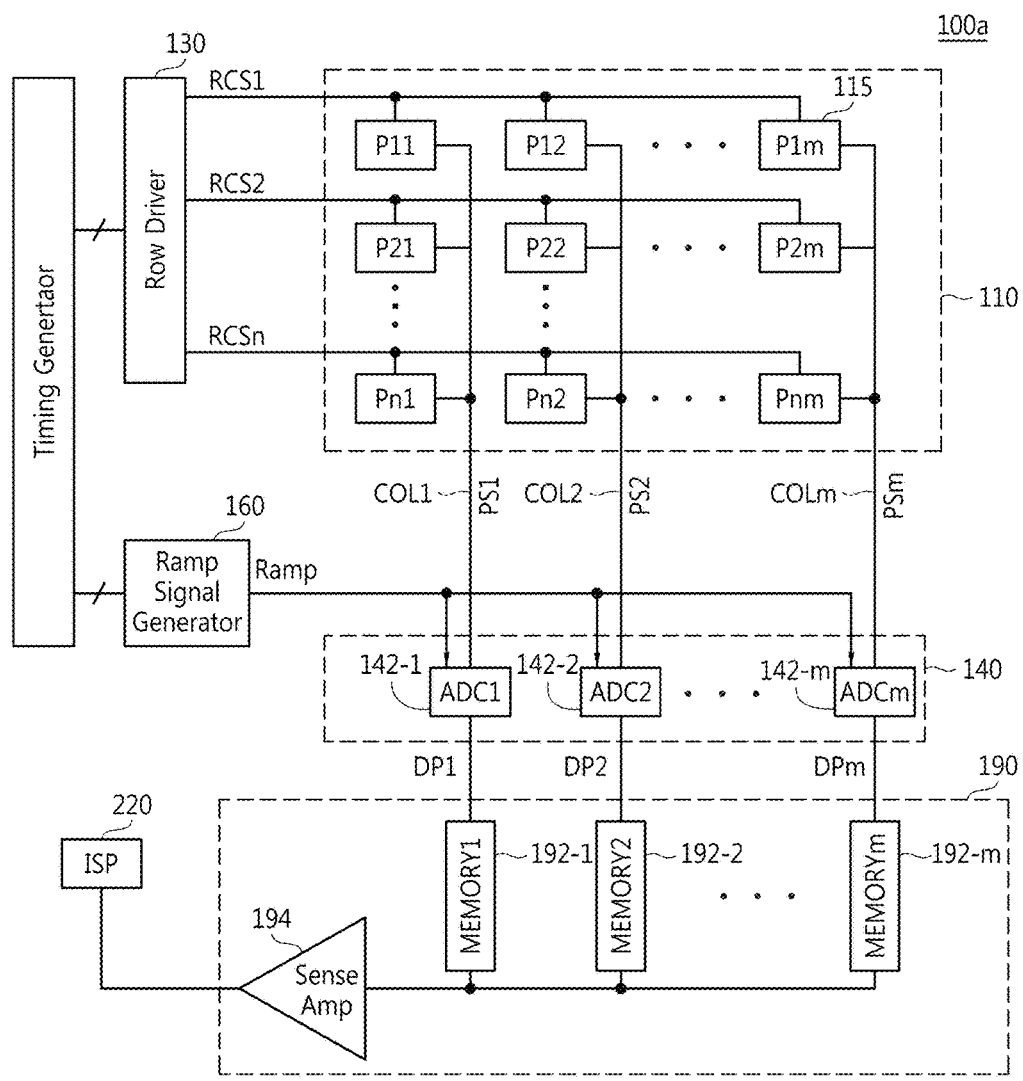
FIG. 2 is a block diagram further illustrating in one example the image sensor of FIG. 1.

FIG. 2 is a block diagram further illustrating in one example (100a) the image sensor 100 of FIG. 1. Referring to FIGS. 1 and 2, the image sensor 100a includes the pixel array 110, row driver 130, ADC block 140, column driver 150, ramp signal generator 160, and buffer 190.

The pixel array 110 includes pixels 115 arranged as array pixels P11 through Pnm, respectively connected among row lines and column lines COL1 through COLm. The pixels 115 may be sequentially activated in response to the row control signals RCS1 through RCSn provided by the row driver 130 in order to output the pixel signals PS1 through PSm via respective column lines COL through COLm. Although not shown in FIG. 2, each of the column lines COL through COLm may be connected to a current source (e.g., IS1 or IS2 in FIGS. 4, 5 and 6) which allows a predetermined current to flow in a connected column line.

The ADC block 140 includes first through m-th ADCs 142-1 through 142-m, where the first through m-th ADCs 142-1 through 142-m are respectively connected to the first through m-th column lines COL through COLm. The first through m-th ADCs 142-1 through 142-m receive the Ramp signal from the ramp signal generator 160 and respectively receive the first through m-th analog pixel signals PS1 through PSm. In response, the first through m-th ADCs 142-1 through 142-m respectively convert the first through m-th analog pixel signals PS1 through PSm into corresponding digital pixel signals DP1 through DPm using the ramp signal Ramp. Thus, in their respective operation, each of the first through m-th ADCs 142-1 through 142-m may compare the Ramp signal with a corresponding analog pixel signal PS, generate a resultant comparison signal (not shown), and perform a counting operation in response to the comparison signal in order to generate a corresponding digital pixel signal DP.

The buffer 190 of FIG. 2 includes first through m-th memories 192-1 through 192-m respectively connected to the first through m-th ADCs 142-1 through 142-m and configured to store the digital pixel signals DP1 through DPm. Thus, the first through m-th memories 192-1 through 192-m may be used to temporarily store the digital pixel signals DP1 through DPm, and then sequentially output the digital pixel signals DP1 through DPm to the sense amplifier 194 under the control of the column driver 150. The sense amplifier 194 may be used to sense and amplify each of the digital pixel signals DP1 through DPm before sequentially outputting same to the ISP 220, where the ISP 220 is assumed to further process the digital pixel signals DP1 through DPm.

Figure 3A:
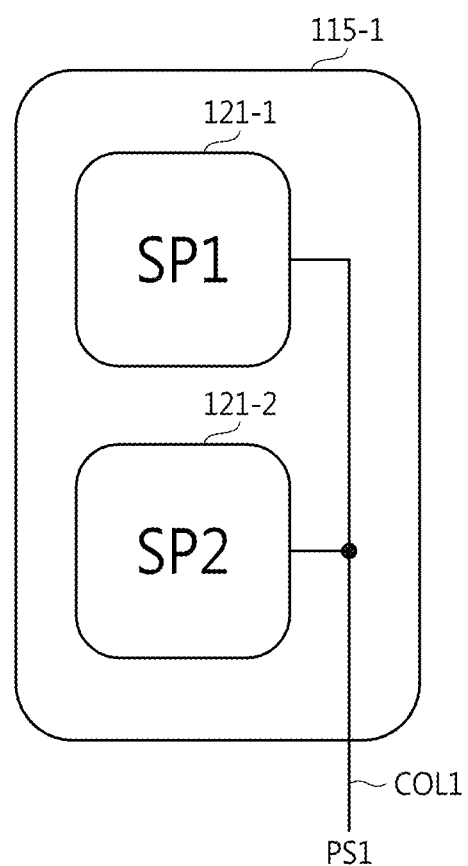
FIGS. 3A, 3B and 3C are diagrams respectively illustrating the pixel element of FIG. 2.
Figure 3B:
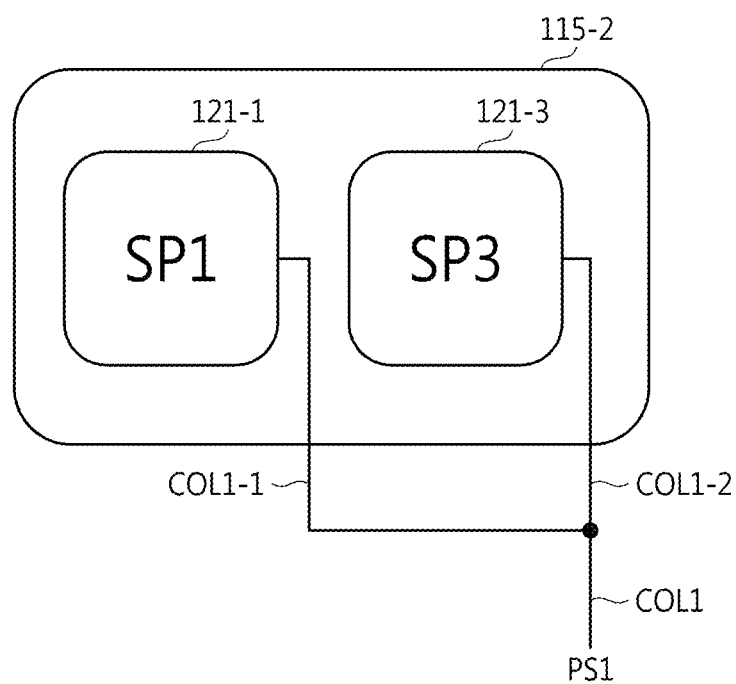
Figure 3C:
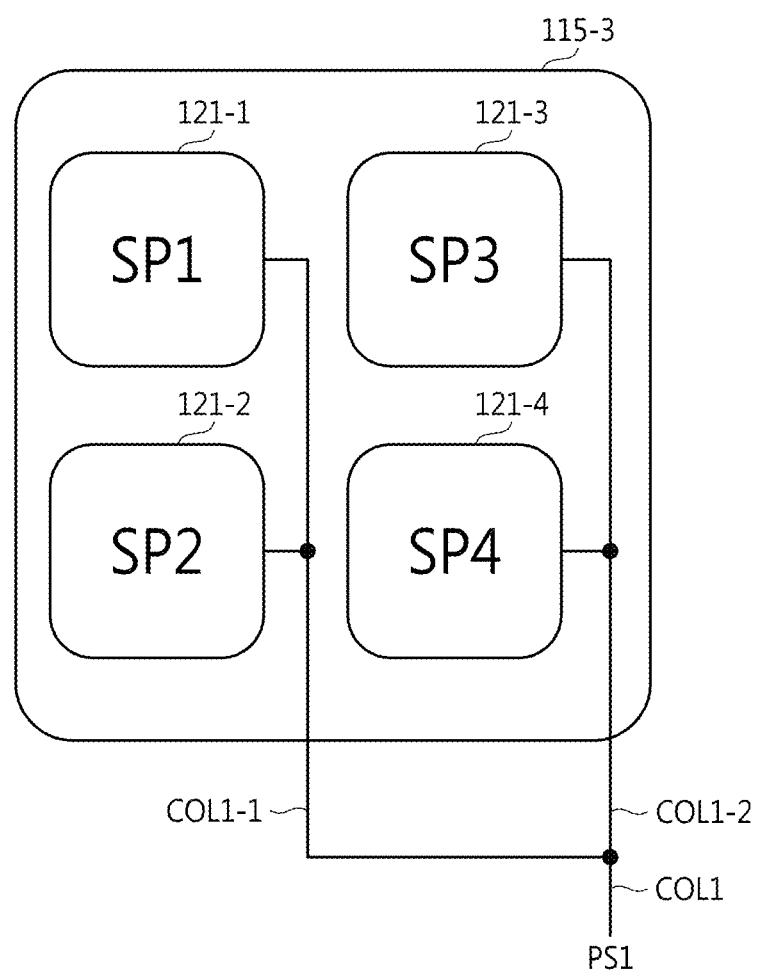

In certain embodiments of the inventive concept, each one of the foregoing pixels 115 arranged in a pixel array 110 may include two or more sub-pixels. These two or more sub-pixels constituting a particular pixel may be referred to as a group of sub-pixels. FIGS. 3A, 3B and 3C are block diagrams illustrating respective examples of pixels 115-1, 115-2 and 115-3 that may be incorporated into embodiments of the inventive concept. Referring to FIG. 3A, a pixel 115-1 includes at least first and second sub-pixels 121-1 and 121-2 capable of respectively generating first and second sub-pixel signals. In the embodiment illustrated in FIG. 3A, first and second sub-pixels 121-1 and 121-2 are arranged in a vertical direction (or a column direction), whereas the first and second sub-pixels 121-1 and 121-3 of pixel 115-2 of FIG. 3B are arranged in a horizontal direction (or a row direction). In this context, those skilled in the art will understand the terms horizontal/vertical, and row/column are arbitrary in nature and are used to describe relative sub-pixel orientations.

Some embodiments of the inventive concept include pixels 115 having more than first and second sub-pixels. For example, the embodiment illustrated in FIG. 3C shows a pixel 115-3 including four sub-pixels 121-1, 121-2, 121-3, and 121-4 arranged in both the vertical and horizontal directions.

However arranged to form a pixel 115, a plurality of sub-pixels may be simultaneously selected. Therefore, the sub-pixels of a particular pixel may be configured to output their corresponding sub-pixel signals at the same time, or in response to a common set of control signals or conditions. Thereafter, the resulting plurality of sub-pixel signals may be processed (e.g., averaged or selected amongst) in order to provide a corresponding analog pixel signal PS to a respective ADC. As may be appreciated from FIGS. 3A, 3B and 3C, respective column lines may be adapted to appropriately connect sub-pixels. For example, a first column line (COL1) may be split into first and second sub-column lines (COL1-1, COL1-2) in order to connect one or more sub-pixels of a pixel 115.

Figure 4:
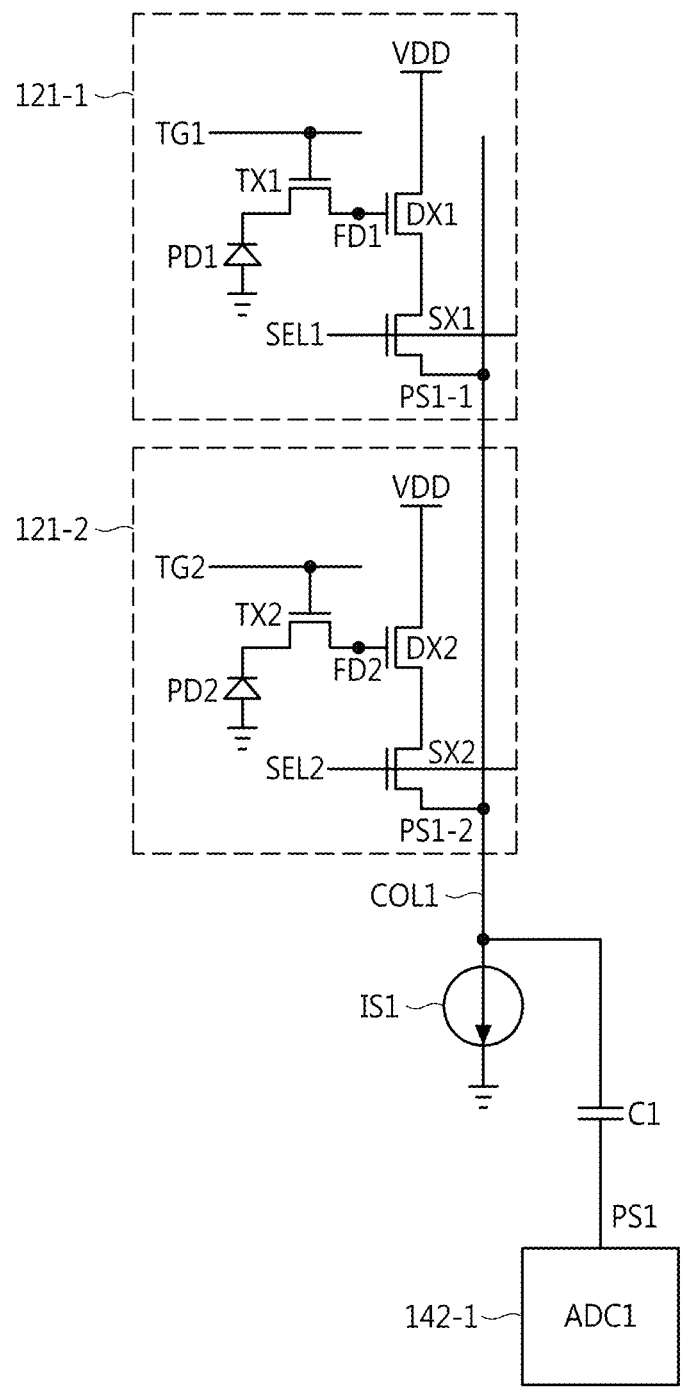
FIG. 4 is a circuit diagram further illustrating the pixel of FIG. 3A.

FIG. 4 is a circuit diagram further illustrating in one example a column line configuration of the pixel 115-1 of FIG. 3A with a corresponding ADC1 142-1. Referring to FIGS. 1, 2, 3A and 4, the pixel 115-1 includes first sub-pixel 121-1 and second sub-pixel 121-2. In certain embodiments of the inventive concept, each one of the pixels 115 in the pixel array 110 of FIG. 2 may have the same structure and may operate in similar manner to the pixel 115-1 described in relation to FIG. 4.

The first sub-pixel 121-1 includes a first photodiode PD1, a first transfer transistor TX1, a first floating diffusion node FD1, a first drive transistor DX1, and a first select transistor SX1. The second sub-pixel 121-2 similarly includes a second photodiode PD2, a second transfer transistor TX2, a second floating diffusion node FD2, a second drive transistor DX2, and a second select transistor SX2.

Each of the first and second photodiodes PD1 and PD2 is an example of a photoelectric conversion element and may include at least one among a photo transistor, a photo gate, a pinned photodiode (PPD), and a combination thereof. First and second transfer control signals TG1 and TG2 and first and second select control signals SEL1 and SEL2 are examples of row control signals that may be provided by the row driver 130. Pixels belonging to a same row in the pixel array 110 (e.g., P11 through P1m) may receive the first and second transfer control signals TG1 and TG2 having the same timing, and the first and second select control signals SEL1 and SEL2 having the same timing.

In the operation of the first sub-pixel 121-1, the first photodiode PD1 generates photocharge in proportion to the intensity of incident light received from object 400. A first end of the first photodiode PD1 may be connected to the first transfer transistor TX1 and a second end of the first photodiode PD1 may be connected to ground voltage VSS or 0V.

The first transfer transistor TX1 passes the photocharge generated by the first photodiode PD1 to the first floating diffusion node FD1 in response to the first transfer control signal TG1. The first drive transistor DX1 amplifies and passes the photocharge accumulated at the first floating diffusion node FD1 to the first select transistor SX1 according to a potential induced by the photocharge. A drain of the first select transistor SX1 is connected to a source of the first drive transistor DX1. The first select transistor SX1 outputs a first sub-pixel signal PS1-1 to the column line COL1 connected to the pixel 115-1 in response to the first select control signal SEL1.

The first sub-pixel 121-1 may also include a first reset transistor (not shown) that may be used to reset the first floating diffusion node FD1 to a power supply voltage VDD in response to a reset control signal (not shown). The power supply voltage VDD is an operating voltage of the pixel array 110 and may be a voltage in a range of from 2.0 to 5.0V.

The structure and operation of the second sub-pixel 121-2 are similar to those of the first sub-pixel 121-1. Thus, the second photodiode PD2 generates photocharge in proportion to the intensity of incident light received from the object 400. A first end of the second photodiode PD2 may be connected to the second transfer transistor TX2 and a second end of the second photodiode PD2 may be connected to ground voltage VSS.

The second transfer transistor TX2 passes the photocharge generated by the second photodiode PD2 to the second floating diffusion node FD2 in response to the second transfer control signal TG2. The second drive transistor DX2 amplifies and passes the photocharge accumulated at the second floating diffusion node FD2 to the second select transistor SX2 according to a potential induced by the photocharge. A drain of the second select transistor SX2 is connected to a source of the second drive transistor DX2. The second select transistor SX2 outputs a second sub-pixel signal PS1-2 to the column line COL1 connected to the pixel 115-1 in response to the second select control signal SEL2.

Here again, the second sub-pixel 121-2 may include a second reset transistor (not shown) to reset the second floating diffusion node FD2 to the power supply voltage VDD in response to a reset control signal (not shown).

In the timing of various operations associated with the pixel 115-1, the first and second floating diffusion nodes FD1 and FD2 may be reset and then a reset signal corresponding to a reset state may be simultaneously output from the first and second sub-pixels 121-1 and 121-2 to the column line COLE Thereafter, the first transfer transistor TX1 passes photocharge accumulated at the first photodiode PD1 to the first floating diffusion node FD1 and the first sub-pixel signal PS1-1 corresponding to the photocharge at the first photodiode PD1 is output to the column line COL1 by operation of the first drive transistor DX1 and the first select transistor SX1. Meanwhile, the second transfer transistor TX2 passes photocharge accumulated at the second photodiode PD2 to the second floating diffusion node FD2 and the second sub-pixel signal PS1-2 corresponding to the photocharge at the second photodiode PD2 is output to the column line COL1 by operation of the second drive transistor DX2 and the second select transistor SX2 at the same time as the first sub-pixel signal PS1-1.

Therefore, the analog pixel signal PS1 corresponding to the averaged voltages (e.g., a first sub-pixel signal PS1-1 and a second sub-pixel signal PS1-2) may be applied to the first ADC 142-1 in order to generated a corresponding digital pixel signal. Accordingly, the analog pixel signal PS1 received by the first ADC 142-1 may be derived, for example, as an average level of the respective voltage levels of the first sub-pixel signal PS1-1 and the second sub-pixel signal PS1-2.

According to the embodiments illustrated in FIG. 4, a single pixel may include two or more sub-pixels each of which includes the photodiode PD1 or PD2 and the floating diffusion node FD1 or FD2, thereby increasing a full well capacity (FWC). The term FWC refers to the maximum amount of charge that can be stored in the constituent photodiode or photodiodes of a pixel. In addition, according to the embodiment illustrated in FIG. 4, photocharge stored in the first floating diffusion node FD1 of the first sub-pixel 121-1 may be output via the first drive transistor DX1 and first select transistor SX1, while photocharge stored in the second floating diffusion node FD2 of the second sub-pixel 121-2 may be output via the second drive transistor DX2 and the second select transistor SX2. With this arrangement, the photocharge generated by the first photodiode PD1 and the photocharge generated by the second photodiode PD2 may be separately converted into an input signal by the first ADC 142-1, thereby increasing an overall conversion gain (CG) for the circuit—an important parameter characterizing the conversion of collected photocharge into a corresponding electrical signal by an ADC.

Since random noise decreases as the CG increases, embodiments of the inventive concept are particularly advantageous in terms of quality of an image signal. Meanwhile, the FWC needs to be increased in order to increase a signal-to-noise ratio (SNR). Therefore, when both the CG and the FWC are increased, the quality of signals is also increased. When both the CG and the FWC are increased; the input signal of the ADC, which is determined by the product of the FWC and the CG, is also increased.

The range of an input signal applied to an ADC is restricted by the power supply voltage VDD applied to the ADC. When the range of the input signal of the ADC is restricted, it is difficult to increase both the FWC and the CG at the same time and a trade-off relationship may be formed, so that the CG needs to be decreased as the FWC is increased or the FWC needs to be decreased as the CG is increased.

As described above, according to certain embodiments of the inventive concept, each pixel includes a plurality of sub-pixels, thereby increasing both the FWC and the CG at the same time. As a result, random noise is decreased and the SNR is increased so that the quality of image signals is improved.

Figure 5:
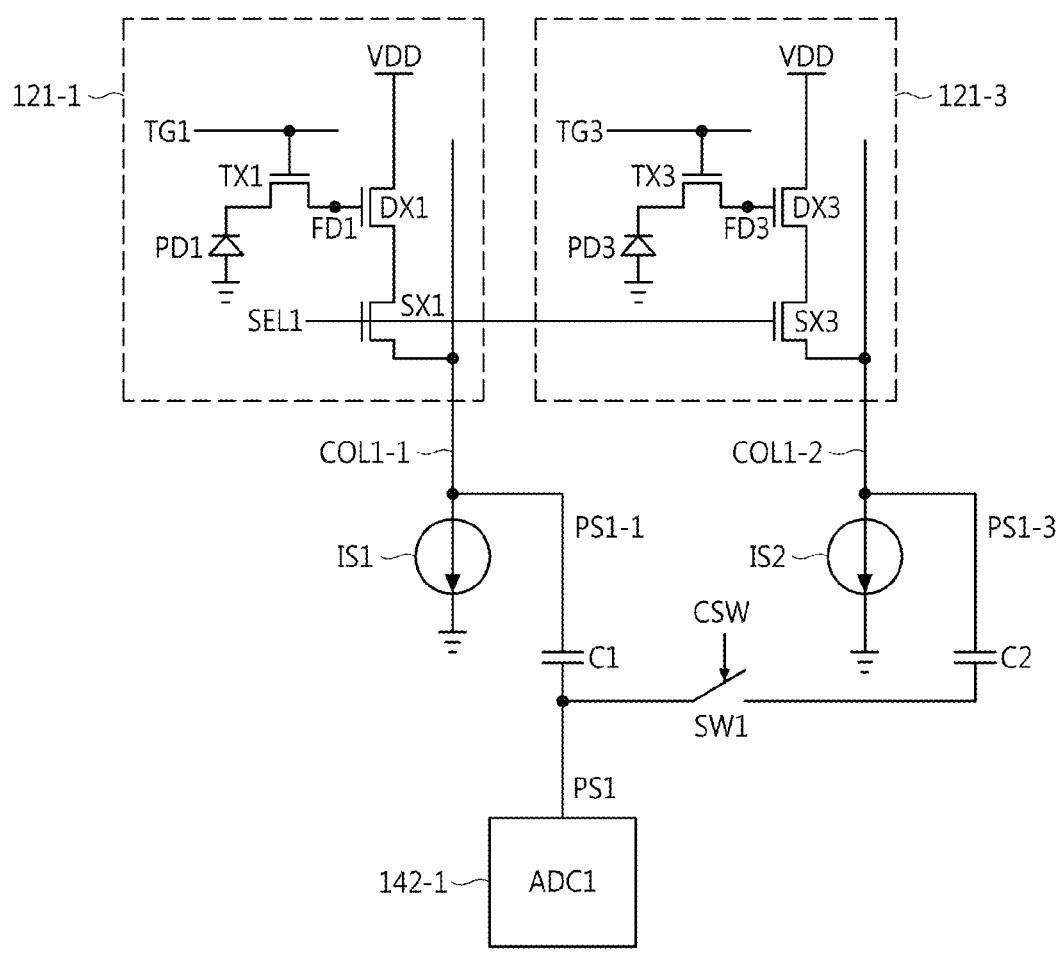
FIG. 5 is a circuit diagram further illustrating the pixel of FIG. 3B.

FIG. 5 is a circuit diagram further illustrating in one example a column line configuration of the pixel 115-2 of FIG. 3B with a corresponding ADC1 142-1. Referring to FIGS. 1, 2, 3B and 5, the pixel 115-21 includes first sub-pixel 121-1 and second sub-pixel 121-2. In certain embodiments of the inventive concept, each one of the pixels 115 in the pixel array 110 of FIG. 2 may have the same structure and may operate in similar manner to the pixel 115-2 described in relation to FIG. 5. The first sub-pixel 121-1 of FIG. 5 may have the same structure and general operation as the first sub-pixel 121-1 shown in FIG. 4. Furthermore, the structure and operation of the third sub-pixel 121-3 may be substantially similar to that of the first sub-pixel 121-1.

The third sub-pixel 121-3 shown in FIG. 5 includes a third photodiode PD3, a third transfer transistor TX3, a third floating diffusion node FD3, a third drive transistor DX3, and a third select transistor SX3. First and third transfer control signals TG1 and TG3 and first and third select control signals SEL1 and SEL3 are examples of row control signals that may be provided by the row driver 130. Here again, pixels belonging to the same row in the pixel array 110 may receive the first and third transfer control signals TG1 and TG3 having the same timing and the first and third select control signals SEL1 and SEL3 having the same timing.

The first sub-pixel 121-1 outputs the first sub-pixel signal PS1-1 corresponding to photocharge generated by the first photodiode PD1 to a first sub-column line COL1-1. The third sub-pixel 121-3 outputs a third sub-pixel signal PS1-3 corresponding to photocharge generated by the third photodiode PD3 to a second sub-column line COL1-2.

The first sub-column line COL1-1 may be connected with the second sub-column line COL1-2 by a switch SW1. The switch SW1 may always be in an ON-state or a closed state or may be selectively activated (e.g., turned ON) during a particular operating mode (e.g., a selected operating mode for the image sensor 100). In other words, a switch control signal CSW for controlling the switch SW1 may be set to a fixed value (e.g., "1") or a value varying with the mode. In other embodiments, the first sub-column line COL1-1 and the second sub-column line COL1-2 may be directly connected with each other without the switch SW1.

A first capacitor C1 may be connected between the first sub-column line COL1-1 and a node of the switch SW1 and a second capacitor C2 may be connected between the second sub-column line COL1-2 and another node of the switch SW1. The first sub-pixel signal PS1-1 output to the first sub-column line COL1-1 and the third sub-pixel signal PS1-3 output to the second sub-column line COL1-2 may be averaged by the capacitors C1 and C2. Accordingly, an average analog pixel signal for the first sub-pixel signal PS1-1 and the third sub-pixel signal PS1-3 may be provided to the first ADC 142-1.

According to the embodiment illustrated in FIG. 5, a pixel may include two or more sub-pixels, thereby increasing both FWC and a CG at the same time. As a result, random noise is decreased and an SNR is increased, so that the quality of image signals is eventually increased.

Figure 6:
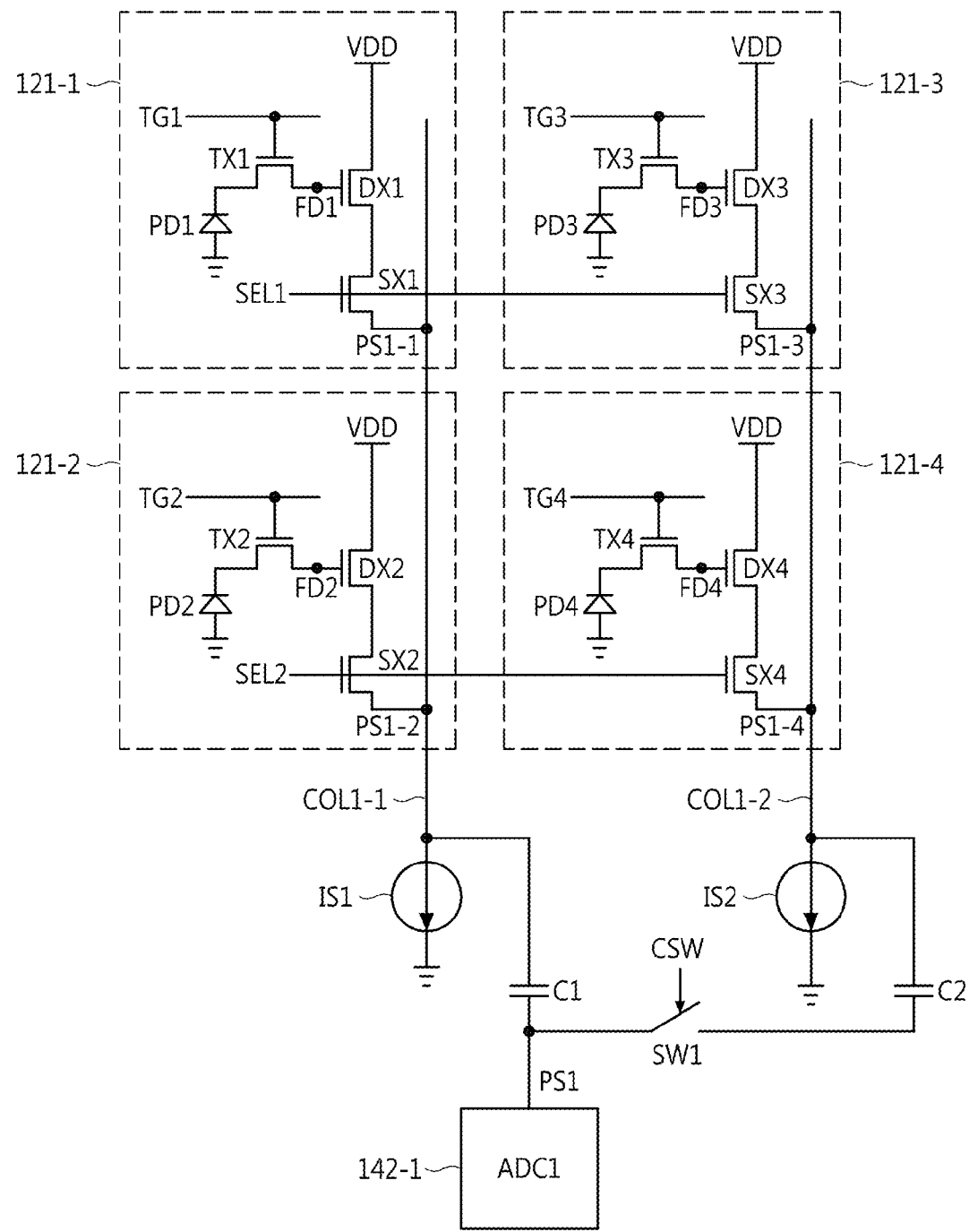
FIG. 6 is a circuit diagram further illustrating the pixel of FIG. 3C.

FIG. 6 is a circuit diagram further illustrating in one example a column line configuration of the pixel 115-3 of FIG. 3C with a corresponding ADC1 142-1. Referring to FIGS. 1, 2, 3C and 6, the pixel 115-3 includes first sub-pixel 121-1 through fourth sub-pixel 121-4. In certain embodiments of the inventive concept, each one of the pixels 115 in the pixel array 110 of FIG. 2 may have the same structure and may operate in similar manner to the pixel 115-3 described in relation to FIG. 6. Here, the structure and operation of the respective first through fourth sub-pixels 121-1 through 121-4 may be substantially similar.

Thus, consistent with the foregoing examples, the first through fourth transfer control signals TG1 through TG4 and first through fourth select control signals SEL1 through SEL4 are examples of row control signals that may be provided by the row driver 130. Pixels belonging to one row in the pixel array 110 may receive the first through fourth transfer control signals TG1 through TG4 having the same timing and the first through fourth select control signals SEL1 through SEL4 having the same timing.

The first and second sub-pixels 121-1 and 121-2 simultaneously output the first and second sub-pixel signals PS1-1 and PS1-2 to the first sub-column line COL1-1. The third and fourth sub-pixels 121-3 and 121-4 simultaneously output third and fourth sub-pixel signals PS1-3 and PS1-4 to the second sub-column line COL1-2.

The first sub-column line COL1-1 may be connected with the second sub-column line COL1-2 by the switch SW1. The switch SW1 may always be in an ON-state or a closed state or may be selectively turned ON in response to a particular operating mode. In other words, the switch control signal CSW for controlling the switch SW1 may be set to a fixed value (e.g., "1") or a value varying with the mode.

The first capacitor C1 may be connected between the first sub-column line COL1-1 and a node of the switch SW1 and the second capacitor C2 may be connected between the second sub-column line COL1-2 and another node of the switch SW1. According to the embodiment illustrated in FIG. 6, a single pixel may provide a voltage averaging effect in the vertical direction and an averaging effect using a capacitor in the horizontal direction. Accordingly, an average signal for the first through fourth sub-pixel signals PS1-1 through PS1-4 may be provided to the first ADC 142-1.

According to the embodiments illustrated in FIG. 6, a pixel includes a plurality of sub-pixels arranged in both the vertical and horizontal directions, thereby increasing an FWC and a CG at the same time. As a result, random noise is decreased and an SNR is increased, so that the quality of image signals is eventually increased.

In the embodiments illustrated in FIGS. 4, 5 and 6, a pixel includes two or more sub-pixels that may be variously arranged in vertical and/or horizontal directions. These embodiments are, however, selected examples and the number and/or arrangement of sub-pixels included in a pixel is deemed to be a matter of design choice. Further, each sub-pixel in the foregoing examples includes one photodiode and three metal oxide semiconductor (MOS) transistors. However, this need not always be the case and other embodiments within the scope of the present invention may include differently configured sub-pixels. Any circuit including at least one photodiode or similar element and corresponding transistor(s) that is capable of converting photocharge generated by the photodiode into a corresponding electrical signal may be applied to various embodiments of the inventive concept.

Figure 7A:
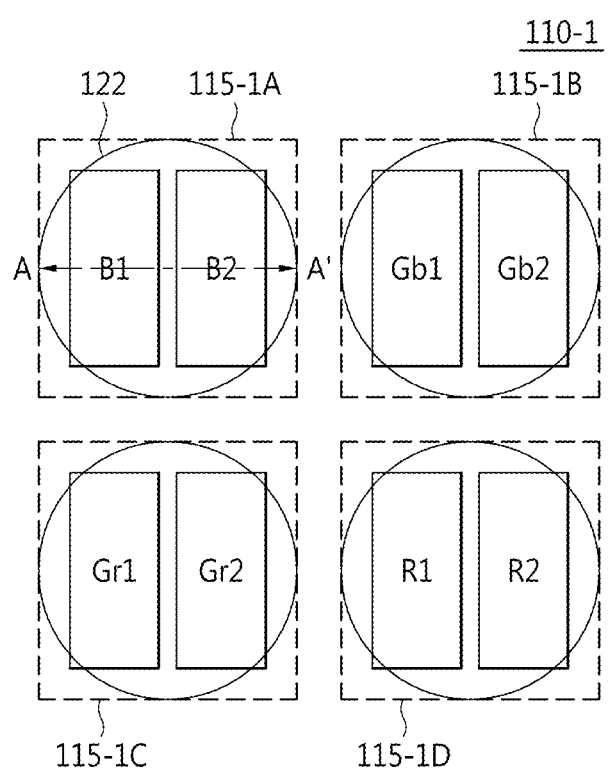
FIGS. 7A, 7B and 7C are layout diagrams illustrating respective examples of the pixel array of FIG. 2.
Figure 7B:
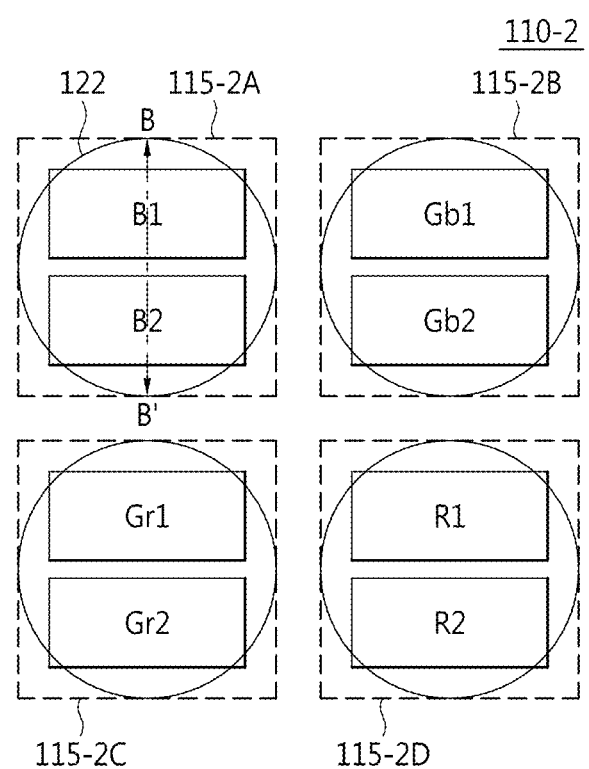
Figure 7C:
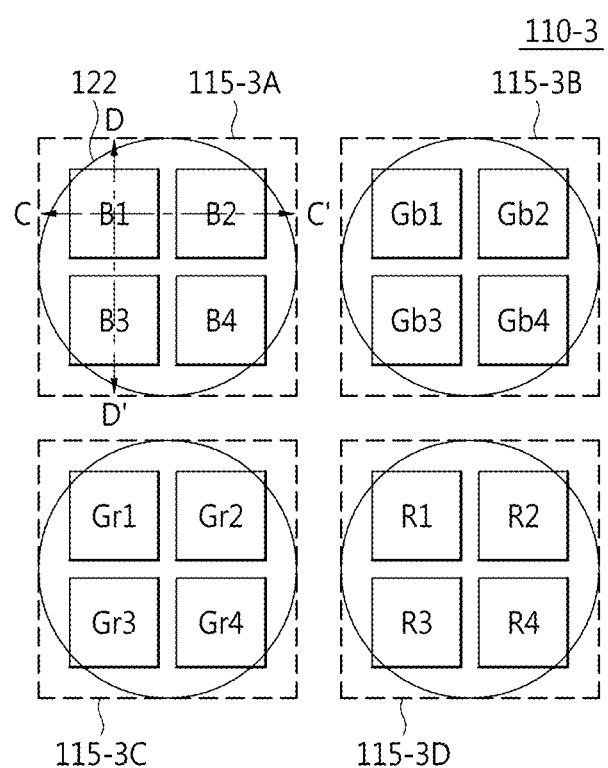

FIGS. 7A, 7B and 7C are respective block diagrams illustrating examples of the pixel array 110 shown in FIG. 2. Only part (i.e., four (4) pixels—115-1A through 115-1D in FIG. 7A) of the pixel array 110 are shown in FIGS. 7A, 7B and 7C for the sake of clarity. Pixels having substantially the same structure as the four illustrated pixels may be formed in the parts of the pixel array 110.

A pixel array 110-1 illustrated in FIG. 7A includes first through fourth pixels 115-1A through 115-1D arranged in a Bayer pattern. In other words, the first pixel 115-1A may be a blue (B) pixel including a blue filter (not shown), the second pixel 115-1B may be a green-on-blue (Gb) pixel including a green filter (not shown), the third pixel 115-1C may be a green-on-red (Gr) pixel including a green filter (not shown), and the fourth pixel 115-1D may be a red (R) pixel including a red filter (not shown).

Each of the first through fourth pixels 115-1A through 115-1D may have a micro lens 122 having an area corresponding to each pixel 115-1A, 115-1B, 115-1C, or 115-1D. The structure and operations of each of the first through fourth pixels 115-1A through 115-1D may be the same as those of the pixel 115-1 illustrated in FIG. 4 or the pixel 115-2 illustrated in FIG. 5. Accordingly, each of the first through fourth pixels 115-1A through 115-1D may include two photodiodes B1 and B2, Gb1 and Gb2, Gr1 and Gr2, or R1 and R2. Two photodiodes (e.g., B1 and B2) may be arranged in the row direction (i.e., a direction parallel to the line A-A') in one pixel (e.g., 115-1A).

A pixel array 110-2 illustrated in FIG. 7B may include first through fourth pixels 115-2A through 115-2D arranged in a Bayer pattern. The pixel array 110-2 is substantially the same as the pixel array 110-1 illustrated in FIG. 7A apart from the differences which will be described below.

The structure and operations of each of the first through fourth pixels 115-2A through 115-2D may be the same as those of the pixel 115-1 illustrated in FIG. 4 or the pixel 115-2 illustrated in FIG. 5. Accordingly, each of the first through fourth pixels 115-2A through 115-2D may include two photodiodes B1 and B2, Gb1 and Gb2, Gr1 and Gr2, or R1 and R2. Two photodiodes (e.g., B1 and B2) may be arranged in the column direction (i.e., a direction parallel to the line B-B') in one pixel (e.g., 115-2A).

A pixel array 110-3 illustrated in FIG. 7C may include first through fourth pixels 115-3A through 115-3D arranged in a Bayer pattern. The pixel array 110-3 is substantially the same as the pixel array 110-1 illustrated in FIG. 7A apart from the differences which will be described below.

The structure and operations of each of the first through fourth pixels 115-3A through 115-3D may be the same as those of the pixel 115-3 illustrated in FIG. 6. Accordingly, each of the first through fourth pixels 115-2A through 115-2D may include four photodiodes B1 through B4, Gb1 through Gb4, Gr1 through Gr4, or R1 through R4. Four photodiodes (e.g., B1 through B4) may be arranged in a matrix form in one pixel (e.g., 115-3A).

Each of the first through fourth pixels 115-3A through 115-3D includes a plurality of sub-pixels each including a photodiode and transistors for converting photocharge generated by the photodiode into an ADC input signal and thus generates the first through fourth sub-pixel signals PS1-1, PS1-2, PS1-3, and PS1-4. The first through fourth sub-pixel signals P51-1, PS1-2, PS1-3, and PS1-4 are generated by accumulating photocharge generated in four different photodiodes (e.g., B1 through B4) from light received through the micro lens 122 in each pixel (e.g., 115-3A). The first through fourth sub-pixel signals PS1-1, PS1-2, PS1-3, and PS1-4 are simultaneously output and then input to one ADC.

Figure 8:
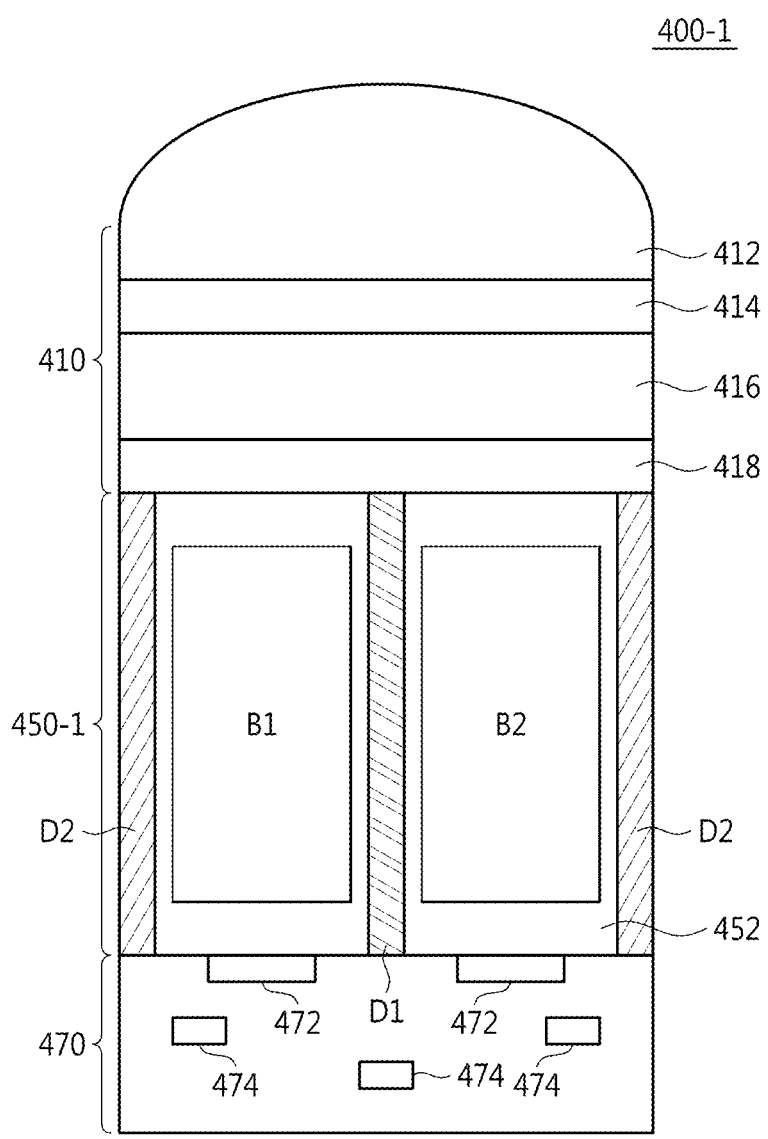
FIG. 8 is a cross-sectional view of a first pixel that may be included in the embodiments of FIGS. 7A, 7B and 7C.

FIG. 8 is a cross-sectional view of a first pixel illustrated in FIGS. 7A, 7B and 7C. Referring to FIGS. 7A, 7B, 7C and 8, a pixel 400-1 illustrated in FIG. 8 is an example of a vertical cross section taken along the line A-A' illustrated in FIG. 7A, the line B-B' illustrated in FIG. 7B, or the line C-C' illustrated in FIG. 7C. Here, it is assumed that FIG. 8 is the cross-sectional view of the pixel 400-1 taken along the line A-A' illustrated in FIG. 7A. The pixel 400-1 may include an incidence layer 410, a semiconductor substrate 450-1, and a wiring layer 470.

The incidence layer 410 may include a micro lens 412, a first flat layer 414, a color filter 416, and a second flat layer 418. The micro lens 412 may be formed at the top (which is assumed to be a position at which incident light first arrives) of the pixel 400-1 to correspond to the pixel 400-1. The micro lens 412 may be used to increase a light gathering power and thus to increase image quality. The micro lens 412 may be the micro lens 122 illustrated in FIG. 7A.

The color filter 416 may be formed below the micro lens 412. The color filter 416 may selectively transmit light with a predetermined wavelength (e.g., red, green, blue magenta, yellow, or cyan). Since the cross-section of the pixel 400-1 is taken along the line A-A' in FIG. 7A, the line B-B' in FIG. 7B, or the line C-C' in FIG. 7C, the color filter 416 is a blue filter selectively transmitting light with blue wavelengths.

The first flat layer 414 and the second plat layer 418 may be respectively formed above and below the color filter 416 to prevent light coming through the micro lens 412 and the color filter 416 from being reflected. In other words, the first flat layer 414 and the second plat layer 418 transmit incident light efficiently, thereby increasing the performance (such as light absorbance and photosensitivity) of the image sensor 100.

The semiconductor substrate 450-1 may include the first photodiode B1, the second photodiode B2, a P-well 452, a first trench D1, and a second trench D2. The first and second photodiodes B1 and B2 may store photocharge generated according to the intensity of light coming through the micro lens 412.

The first and second photodiodes B1 and B2 may be formed as n-type regions within the P-well 452 by performing ion-implantation. Each of the first and second photodiodes B1 and B2 may be formed in a structure in which a plurality of doped regions are stacked. At this time, the top toped region may be formed using n+-type ion implantation and the bottom doped region may be formed using n--type ion implantation.

The P-well 452 may be formed to surround the first and second photodiodes B1 and B2. The P-well 452 may electrically insulate the first and second photodiodes B1 and B2 from the wiring layer 470. An n++ doped region (not shown) adjacent to a gate 472 of each of the transistors TX1, TX2, DX1, DX2, SX1, and SX2 in the P-well 452 may operate as a source/drain of each transistor TX1, TX2, DX1, DX2, SX1, or SX2.

The first and second trenches D1 and D2 may be formed using a trench process. The trench process is a process of forming a trench in the semiconductor substrate 450-1 to a certain depth. The trench process may be divided into a deep trench isolation (DTI) process producing a relatively deeper trench and a shallow trench isolation (STI) process producing a relatively shallower trench. Each of the first and second trenches D1 and D2 may be a DTI formed using the DTI process or an STI formed using the STI process.

The first trench D1 may electrically isolate adjacent photo diodes (e.g., B1 and B2 or B1 and B3) from each other among a plurality of photo diodes (e.g., B1 through B4). The second trench D2 may electrically isolate a photo diode (e.g., B2) in the first pixel 115-1A, 115-2A, or 115-3A from a photodiode (e.g., Gb1) in another pixel (e.g., 115-1B, 115-2B, or 115-3B) adjacent to the first pixel 115-1A, 115-2A, or 115-3A.

The first and second trenches D1 and D2 may be formed along the full length of the semiconductor substrate 450-1. The first and second trenches D1 and D2 may be formed using a back trench process in which a trench is formed starting from the side of the incidence layer 410 or using a front trench process in which a trench is formed starting from the side of the wiring layer 470.

The semiconductor substrate 450-1 may also include a floating diffusion node (not shown) and a ground terminal (not shown). The wiring layer 470 may include the gate 472 of each of the transistors TX1, TX2, DX1, DX2, SX1, and SX2 and multi-layer conductive lines 474. The gate 472 may receive a control signal or may be connected to the floating diffusion node. A gate insulation layer (not shown) may be formed between the gate 472 and the semiconductor substrate 450-1.

The gate insulation layer may be formed of $SiO_2$, SiON, SiN, $Al_2O_3$, $Si_3N_4$, $Ge_xO_yN_z$, $Ge_xSi_yO_z$, or a high-dielectric material. The high-dielectric material may be formed by performing atomic layer deposition using $HfO_2$, $ZrO_2$, $Al_2O_3$, $Ta_2O_5$, hafnium silicate, zirconium silicate, or a combination thereof.

The multi-layer conductive lines 474 may transmit signals among the transistors TX1, TX2, DX1, DX2, SX1, and SX2 or may transmit a signal between the pixel 400-1 and the outside. The multi-layer conductive lines 474 may be formed by patterning a conductive material including metal such as copper or aluminum.

Figure 9:
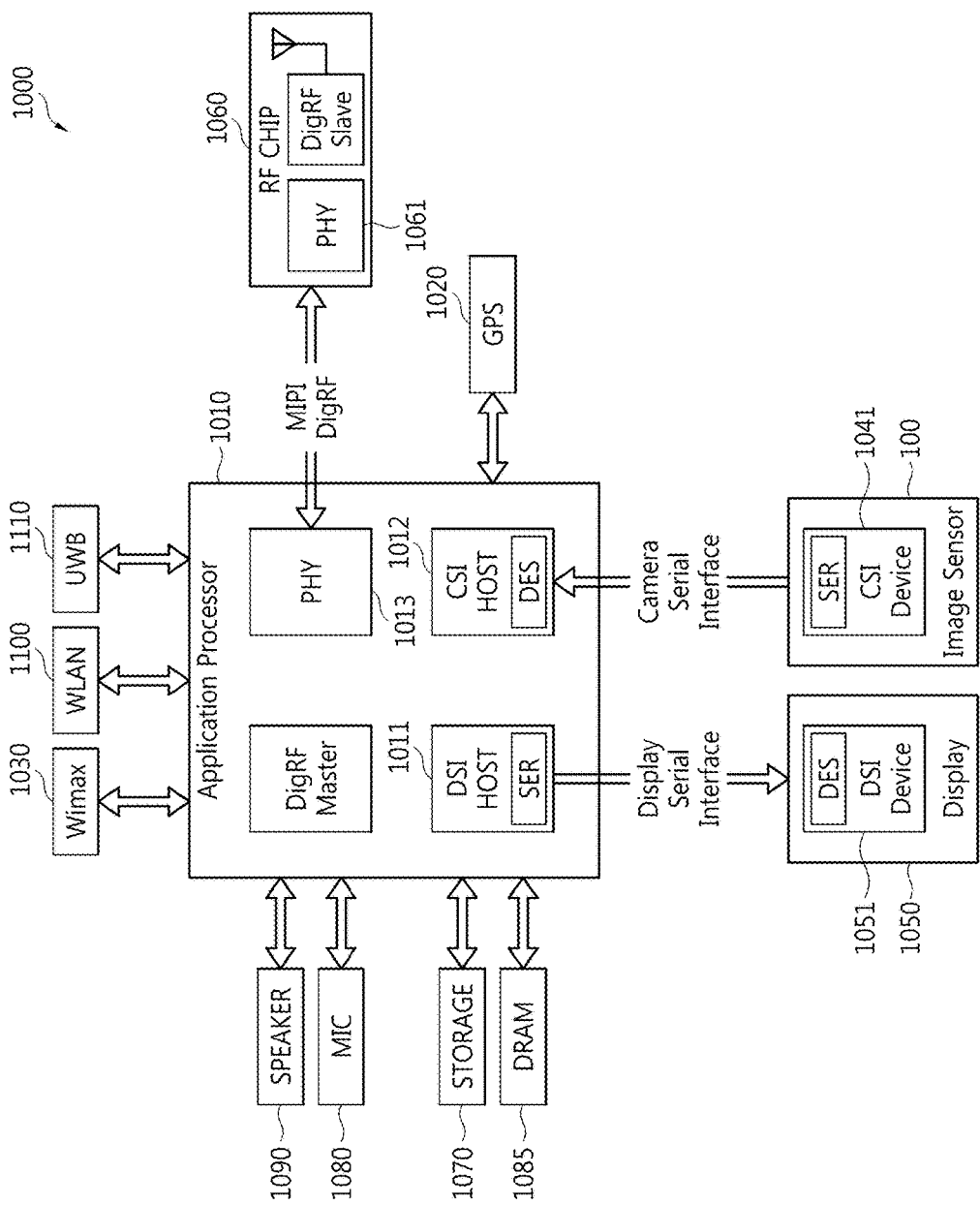
FIG. 9 is a block diagram of an electronic system including an image sensor according to some embodiments of the inventive concept.

FIG. 9 is a block diagram of an electronic system including one or more image sensor(s) according to an embodiment of the inventive concept. The electronic system 1000 may be implemented by a data processing apparatus, such as a mobile phone, a personal digital assistant (PDA), a portable media player (PMP), an IP TV, or a smart phone that can use or support the MIPI interface. The electronic system 1000 includes an application processor 1010, an image sensor 100, and a display 1050.

A camera serial interface (CSI) host 1012 included in the application processor 1010 performs serial communication with a CSI device 1041 included in the image sensor 100 through CSI. For example, an optical de-serializer (DES) may be implemented in the CSI host 1012, and an optical serializer (SER) may be implemented in the CSI device 1041.

A display serial interface (DSI) host 1011 included in the application processor 1010 performs serial communication with a DSI device 1051 included in the display 1050 through DSI. For example, an optical serializer may be implemented in the DSI host 1011, and an optical de-serializer may be implemented in the DSI device 1051.

The electronic system 1000 may also include a radio frequency (RF) chip 1060 which communicates with the application processor 1010. A physical layer (PHY) 1013 of the electronic system 1000 and a PHY 1061 of the RF chip 1060 communicate data with each other according to a MIPI DigRF standard. The electronic system 1000 may further include at least one element among a GPS 1020, a storage device 1070, a microphone 1080, a DRAM 1085 and a speaker 1290. The electronic system 1000 may communicate using Wimax (World Interoperability for Microwave Access) 1030, WLAN (Wireless LAN) 1100 or USB 1110, UWB (Ultra Wideband) etc.

Figure 10:
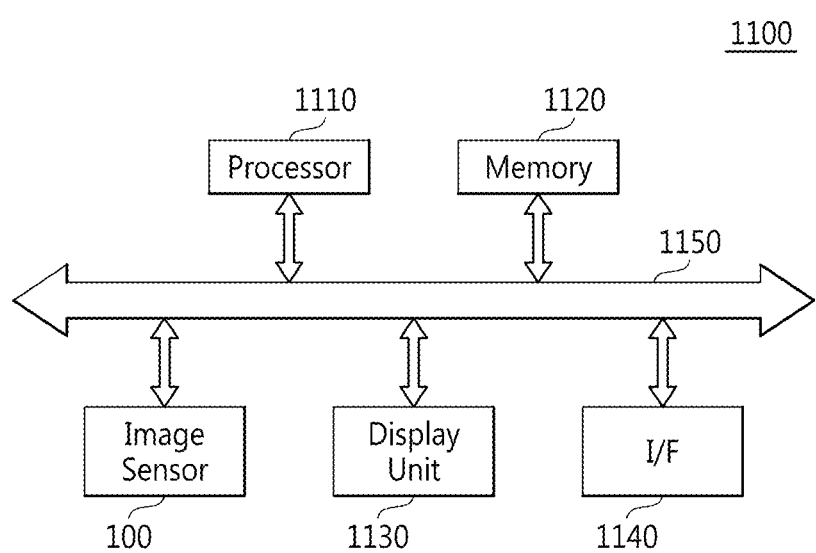
FIG. 10 is a block diagram of an image processing system 1100 including the image sensor 100 according to some embodiments of the inventive concept.

FIG. 10 is a block diagram of an image processing system 1100 including one or more image sensor(s) 100 according to an embodiment of the inventive concept. Referring to FIG. 10, the image processing system 1100 may include a processor 1110, a memory 1120, the image sensor 100, a display unit 1130, and an I/F 1140.

The processor 1110 may control the operation of the image sensor 100. The processor 1110 may determine whether a camera is in a predetermined mode (for example, a live-view mode or a preview mode) and control the image sensor 100 to operate in the skip mode.

The memory 1120 may store a program for controlling the operation of the image sensor 100 through a bus 1150 according to the control of the processor 1110 and may also store the image. The processor 1110 may access the memory 1120 and execute the program. The memory 1120 may be formed as a non-volatile memory.

The image sensor 100 may generate image information, under the control of the processor 1110.

The display unit 1130 may receive the image from the processor 1110 or the memory 1120 and display the image on a display (e.g., a liquid crystal display (LCD) or an active-matrix organic light emitting diode (AMOLED) display). The I/F 1140 may be formed for the input and output of the two or three dimensional image. The I/F 1140 may be implemented as a wireless I/F.

The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

As described above, according to some embodiments of the inventive concept, an image sensor increases a CG and an FWC corresponding to the maximum number of charges that can be stored in at least one photodiode in a pixel at the same time, thereby decreasing random noise and increasing an SNR. As a result, the quality of image signals is increased.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. An image sensor, comprising:
a pixel array including a pixel connected to a column line and configured to provide an analog pixel signal to the column line in response to at least one row control signal; and
an analog-to-digital converter (ADC) that receives and converts the analog pixel signal into a corresponding digital pixel signal,
wherein the pixel comprises:
a first sub-column line,
a second sub-column line,
a first capacitor connecting the first sub-column line to the column line,
a second capacitor connecting the second sub-column line to the column line, and
a group of sub-pixels, wherein each sub-pixel has its own floating diffusion node and has at least one transistor for outputting a photocharge of the floating diffusion node to the column line, and wherein the sub-pixels are simultaneously selected by the at least one row control signal, such that each one of the sub-pixels in the group of sub-pixels provides a sub-pixel signal, and the analog pixel signal is an average of the sub-pixel signals provided by the group of sub-pixels,
wherein the group of sub-pixels includes a first sub-pixel providing a first sub-pixel signal, a second sub-pixel providing a second sub-pixel signal, a third sub-pixel providing a third sub-pixel signal, and a fourth sub-pixel providing a fourth sub-pixel signal, wherein the first sub-pixel and the second sub-pixel are arranged in a column direction with respect to each other, the third sub-pixel and the fourth sub-pixel are arranged in the column direction with respect to each other, the first sub-pixel and the third sub-pixel are arranged in a row direction with respect to each other, and the second sub-pixel and the fourth sub-pixel are arranged in the row direction with respect to each other,
wherein the at least one row control signal includes a first transfer control signal, a second transfer control signal, and a first select control signal and a second select control signal,
wherein the at least one transistor of each sub-pixel comprises:
a transfer transistor that passes the photocharge to the floating diffusion node of the sub-pixel in response to one of the transfer control signals, and
a select transistor that provides a corresponding electrical signal to one of the sub-column lines in response to one of the select control signals, and
wherein the select transistor of the first sub-pixel and the select transistor of the second sub-pixel are simultaneously activated by the first select control signal and the second select control signal, respectively, to provide the first sub-pixel signal and the second sub-pixel signal to the first sub-column line at a same time as each other, and
wherein the select transistor of the third sub-pixel and the select transistor of the fourth sub-pixel are simultaneously activated by the first select control signal and the second select control signal, respectively, to provide the third sub-pixel signal and the fourth sub-pixel signal to the second sub-column line at a same time as each other.

2. The image sensor of claim 1, wherein each one of the first sub-pixel and second sub-pixel comprises:
  a photodiode that accumulates the photocharge proportional to an intensity of incident light,
  wherein the photodiode of the first sub-pixel and the photodiode of the second sub-pixel receive incident light passed through a same micro lens as each other.

3. The image sensor of claim 1, wherein each one of the first sub-pixel, the second sub-pixel, the third sub-pixel, and the fourth sub-pixel comprises:
  a photodiode that accumulates the photocharge proportional to an intensity of incident light,
  wherein the photodiode of the first sub-pixel, the photodiode of the second sub-pixel, the photodiode of the third sub-pixel, and the photodiode of the fourth sub-pixel receive incident light passed through a same micro lens as each other.

4. The image sensor of claim 1, wherein the pixel further comprises a switch which is selectively activated during at least one operating mode of the image sensor to connect the column line to the second sub-column line via the second capacitor.

5. An image processing system, comprising:
  an image sensor that provides an output signal;
  a processor that controls operation of the image sensor, receives the output signal and generates an image signal from the output signal; and
  a display unit that displays an image corresponding to the image signal received from the processor,
  wherein the image sensor comprises:
    a pixel array including a pixel connected to a column line and configured to provide an analog pixel signal to the column line in response to at least one row control signal; and
    an analog-to-digital converter (ADC) that receives and converts the analog pixel signal into a corresponding digital pixel signal,
    wherein the pixel comprises:
      a first sub-column line,
      a second sub-column line,
      a first capacitor connecting the first sub-column line to the column line,
      a second capacitor connecting the second sub-column line to the column line, and
      a group of sub-pixels, wherein each sub-pixel has its own floating diffusion node and has at least one transistor for outputting a photocharge of the floating diffusion node to the column line, and wherein the sub-pixels are simultaneously selected by the at least one row control signal, such that each one of the sub-pixels in the group of sub-pixels provides a sub-pixel signal, and the analog pixel signal is an average of the sub-pixel signals provided by the group of sub-pixels,
    wherein the group of sub-pixels includes a first sub-pixel providing a first sub-pixel signal, a second sub-pixel providing a second sub-pixel signal, a third sub-pixel providing a third sub-pixel signal, and a fourth sub-pixel providing a fourth sub-pixel signal, wherein the first sub-pixel and second sub-pixel are arranged in a column direction with respect to each other, the third sub-pixel and the fourth sub-pixel are arranged in the column direction with respect to each other, the first sub-pixel and the third sub-pixel are arranged in a row direction with respect to each other, and the second sub-pixel and the fourth sub-pixel are arranged in the row direction with respect to each other,
    wherein the at least one row control signal includes a first transfer control signal, a second transfer control signal, and a first select control signal and a second select control signal,
    wherein the at least one transistor of each sub-pixel comprises:
      a transfer transistor that passes the photocharge to the floating diffusion node of the sub-pixel in response to one of the transfer control signals, and
      a select transistor that provides a corresponding electrical signal to one of the sub-column lines in response to one of the select control signals, and
    wherein the select transistor of the first sub-pixel and the select transistor of the second sub-pixel are simultaneously activated by the first select control signal and the second select control signal, respectively, to provide the first sub-pixel signal and the second sub-pixel signal to the first sub-column line at a same time as each other, and
    wherein the select transistor of the third sub-pixel and the select transistor of the fourth sub-pixel are simultaneously activated by the first select control signal and the second select control signal, respectively, to provide the third sub-pixel signal and the fourth sub-pixel signal to the second sub-column line at a same time as each other.

6. The image processing system of claim 5, wherein the first sub-pixel, second sub-pixel, third sub-pixel and fourth sub-pixel are arranged in a Bayer pattern.

7. The image processing system of claim 5, wherein each one of the first sub-pixel, the second sub-pixel, the third sub-pixel, and the fourth sub-pixel comprises:
  a photodiode that accumulates the photocharge proportional to an intensity of incident light,
  wherein the photodiode of the first sub-pixel, the photodiode of the second sub-pixel, the photodiode of the third sub-pixel, and the photodiode of the fourth sub-pixel receive incident light passed through a same micro lens as each other.

8. The image processing system of claim 5, wherein the pixel further comprises a switch which is selectively activated during at least one operating mode of the image sensor to connect the column line to the second sub-column line via the second capacitor.

9. An image processing system, comprising:
  an image sensor that provides an output signal;
  a processor that controls operation of the image sensor, receives the output signal and generates an image signal from the output signal; and
  a display unit that displays an image corresponding to the image signal received from the processor,
  wherein the image sensor comprises a plurality of pixels arranged in a pixel array, wherein each one of the plurality of pixels is connected to a column line among a plurality of column lines and provides an analog pixel signal to the column line in response to at least one row control signal, and wherein each one of the pixels comprises:
    a first sub-column line,
    a second sub-column line,
    a first capacitor connecting the first sub-column line to the column line, a second capacitor connecting the second sub-column line to the column line, and a group of sub-pixels, wherein each sub-pixel has its own floating diffusion node and has at least one transistor for outputting a photocharge of the floating diffusion node to the column line, and wherein the sub-pixels are simultaneously selected by the at least one row control signal, such that each one of the sub-pixels provides a corresponding sub-pixel signal, the analog pixel signal being derived from the sub-pixel signals provided by the group of sub-pixels, wherein the group of sub-pixels includes a first sub-pixel providing a first sub-pixel signal, a second sub-pixel providing a second sub-pixel signal, a third sub-pixel providing a third sub-pixel signal, and a fourth sub-pixel providing a fourth sub-pixel signal, wherein the first sub-pixel and second sub-pixel are arranged in a column direction with respect to each other, the third sub-pixel and the fourth sub-pixel are arranged in the column direction with respect to each other, the first sub-pixel and the third sub-pixel are arranged in a row direction with respect to each other, and the second sub-pixel and the fourth sub-pixel are arranged in the row direction with respect to each other, wherein the at least one row control signal includes a first transfer control signal, a second transfer control signal, and a first select control signal and a second select control signal, wherein the at least one transistor of each sub-pixel comprises:
　a transfer transistor that passes the photocharge to the floating diffusion node of the sub-pixel in response to one of the transfer control signals, and
　a select transistor that provides a corresponding electrical signal to the column line in response to one of the select control signals, and wherein the select transistor of the first sub-pixel and the select transistor of the second sub-pixel are simultaneously activated by the first select control signal and the second select control signal, respectively, to provide the first sub-pixel signal and the second sub-pixel signal to the column line at a same time as each other, and wherein the select transistor of the third sub-pixel and the select transistor of the fourth sub-pixel are simultaneously activated by the first select control signal and the second select control signal, respectively, to provide the third sub-pixel signal and the fourth sub-pixel signal to the second sub-column line at a same time as each other.

10. The image processing system of claim 9, wherein the image sensor includes an analog-to-digital converter (ADC) configured to receive the analog pixel signal and to convert the analog pixel signal into a corresponding digital pixel signal, wherein the analog signal is an average of the first sub-pixel signal, the second sub-pixel signal, the third sub-pixel signal and the fourth sub-pixel signal.

11. The image processing system of claim 9, wherein each one of the first sub-pixel, the second sub-pixel, the third sub-pixel, and the fourth sub-pixel comprises:
　a photodiode that accumulates the photocharge proportional to an intensity of incident light,
　wherein the photodiode of the first sub-pixel, the photodiode of the second sub-pixel, the photodiode of the third sub-pixel, and the photodiode of the fourth sub-pixel receive incident light passed through a same micro lens as each other.

12. The image processing system of claim 9, wherein each pixel further comprises a switch which is selectively activated during at least one operating mode of the image sensor to connect the column line to the second sub-column line via the second capacitor.

* * * * *